(12) United States Patent
Daams et al.

(10) Patent No.: US 11,023,181 B2
(45) Date of Patent: Jun. 1, 2021

(54) SYSTEMS AND METHODS FOR OPERATING MULTIPLE CLIENT PRINTING SYSTEMS

(71) Applicant: PrinterLogic, Inc., St. George, UT (US)

(72) Inventors: Mark Johannes Theodorus Daams, St. George, UT (US); Corey Clint Ercanbrack, Washington, UT (US)

(73) Assignee: PrinterLogic, Inc., St. George, UT (US)

( * ) Notice: Subject to any disclaimer, the term of this patent is extended or adjusted under 35 U.S.C. 154(b) by 0 days.

(21) Appl. No.: 16/455,602

(22) Filed: Jun. 27, 2019

(65) Prior Publication Data

US 2020/0004470 A1 Jan. 2, 2020

Related U.S. Application Data

(60) Provisional application No. 62/692,549, filed on Jun. 29, 2018.

(51) Int. Cl.
*G06F 3/12* (2006.01)
*G06Q 20/14* (2012.01)

(52) U.S. Cl.
CPC .......... *G06F 3/1204* (2013.01); *G06F 3/1226* (2013.01); *G06F 3/1231* (2013.01); *G06Q 20/14* (2013.01); *G06F 3/1288* (2013.01)

(58) Field of Classification Search
CPC .... G06F 3/1204; G06F 3/1226; G06F 3/1231; G06F 3/1288; G06F 21/105; G06F 16/00; G06F 17/00; G06F 19/00; G06F 21/12; G06F 21/50; G06Q 20/14
See application file for complete search history.

(56) References Cited

U.S. PATENT DOCUMENTS

| | | | |
|---|---|---|---|
| 2001/0013024 A1* | 8/2001 | Takahashi | G06F 21/10 705/59 |
| 2002/0022971 A1* | 2/2002 | Tanaka | G06F 21/10 705/26.1 |
| 2004/0227973 A1* | 11/2004 | Taylor | G06F 3/1204 358/1.15 |
| 2007/0292145 A1 | 12/2007 | Drose et al. | |
| 2012/0210442 A1* | 8/2012 | Ito | G06F 21/10 726/26 |
| 2013/0163037 A1 | 6/2013 | Huster | |

(Continued)

OTHER PUBLICATIONS

International Search Report and Written Opinion issued for PCT Application No. PCT/US2019/039920 dated Sep. 24, 2019.

*Primary Examiner* — Moustapha Diaby
(74) *Attorney, Agent, or Firm* — Austin Rapp

(57) ABSTRACT

A method for operating multiple client printing systems is described. The method includes creating an administration account. The method also includes instantiating a printing manager instance for each of the multiple client printing systems. The multiple client printing systems are associated with the administration account. The method further includes presenting a data structure comprising an object associated with each of the multiple client printing systems. The method additionally includes determining license usage data for the multiple client printing systems based on the printing manager instances. The method also includes presenting the license usage data.

18 Claims, 12 Drawing Sheets

(56) References Cited

U.S. PATENT DOCUMENTS

| | | |
|---|---|---|
| 2013/0222827 A1 | 8/2013 | Watanabe |
| 2015/0234621 A1 | 8/2015 | Kimura |
| 2016/0253132 A1* | 9/2016 | Nishida .............. H04N 1/00973 358/1.15 |
| 2017/0228201 A1 | 8/2017 | Taylor et al. |
| 2018/0018613 A1* | 1/2018 | Richardson .... G06Q 10/063116 |

* cited by examiner

SYSTEMS AND METHODS FOR OPERATING MULTIPLE CLIENT PRINTING SYSTEMS

RELATED APPLICATIONS

This application is related to and claims priority from U.S. Provisional Patent Application Ser. No. 62/692,549, filed Jun. 29, 2018 for "SYSTEMS AND METHODS FOR MANAGING MULTIPLE CLIENT PRINTING ENTITIES," which is incorporated herein by reference.

TECHNICAL FIELD

The present disclosure generally relates to computers and computer-related technology. More specifically, the present disclosure relates to systems and methods for operating multiple client printing systems.

BACKGROUND

Computer technologies continue to advance at a rapid pace. Computers commonly used include everything from hand-held computing devices to large multi-processor computer systems. These computers include software operating systems and applications that include user interfaces, in order to make them useful and accessible to an end user. Computers are increasingly linked with other computers and other devices, such as printers, through networks.

One of the challenges involved with computers is configuring printers. For example, configuring a large number of printers may be a time-consuming process.

DETAILED DESCRIPTION

Figure 1:
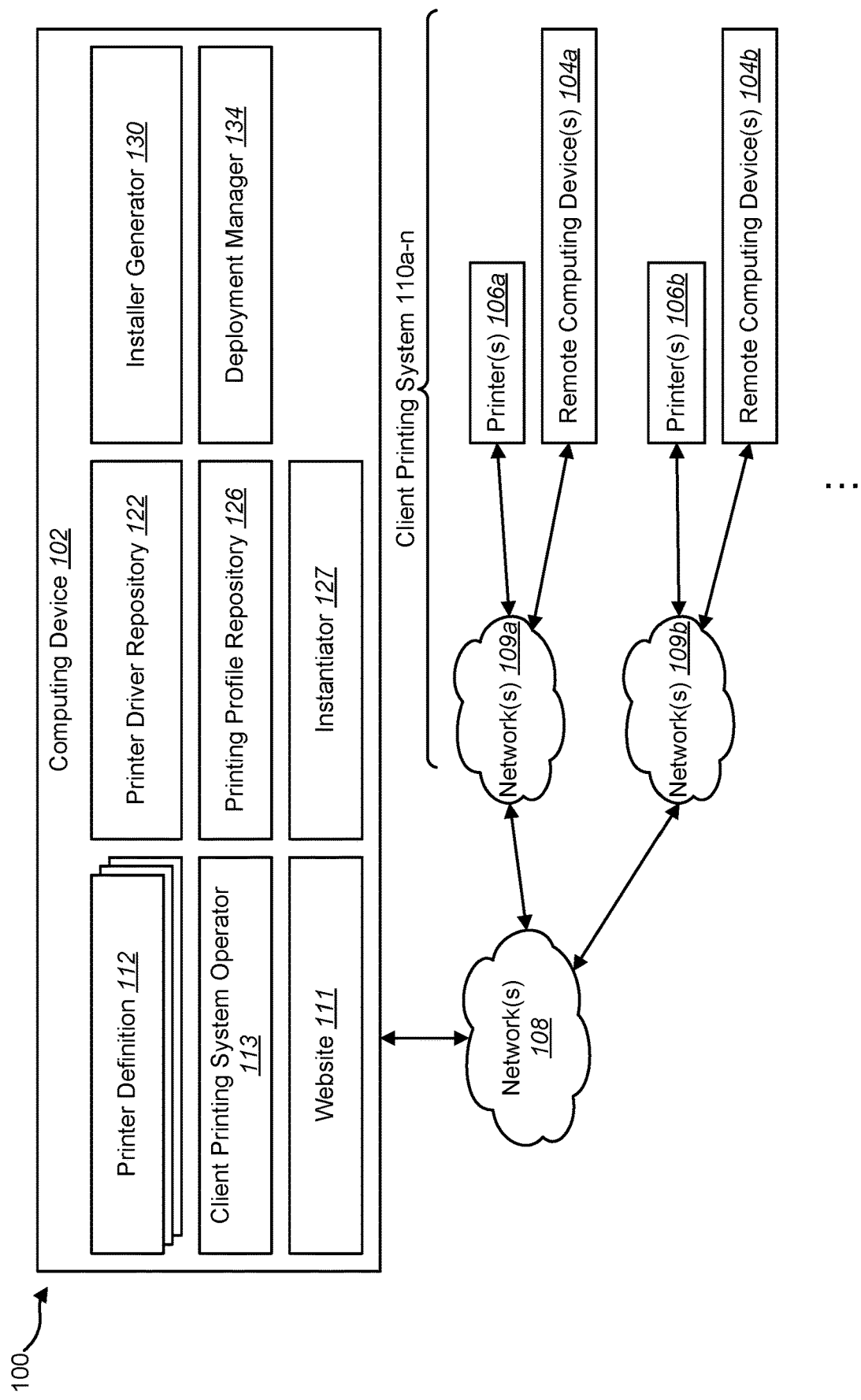
FIG. 1 is a block diagram illustrating an example of a configuration of devices for operating multiple client printing systems.

A method for operating multiple client printing systems is described herein. The method includes creating an administration account. The method also includes instantiating a printing manager instance for each of the multiple client printing systems. The multiple client printing systems are associated with the administration account. The method further includes presenting a data structure including an object associated with each of the multiple client printing systems. The method additionally includes determining license usage data for the multiple client printing systems based on the printing manager instances. The method also includes presenting the license usage data.

Determining the license usage data may include determining a number of installed printers for each of the multiple client printing systems. Determining the license usage data may include determining a client average license usage for each of the multiple client printing systems for a billing cycle and determining a summary average license usage over all of the multiple client printing systems for the billing cycle. The method may include generating a bill for the billing cycle for the administration account based on the summary average license usage over all of the multiple client printing systems for the billing cycle.

The method may include determining one or more folders for the data structure. Each of the one or more folders includes one or more of the objects associated with one or more of the multiple client printing systems. The method may include determining user permissions, which may include granting or restricting access to at least one of the objects or one or more folders for a user account.

The method may include presenting billing information based on user permissions. The method may include sharing settings or resources across multiple printing manager instances. The method may include sharing printer drivers and printer profiles across a plurality of the multiple client printing systems. The method may include setting a global printing manager instance configuration and applying the global printing manager instance configuration to a plurality of the printing manager instances.

A computing device is also described. The computing device includes a processor. The computing device also includes memory in electronic communication with the processor. The computing device further includes instructions stored in the memory. The instructions are executable to create an administration account. The instructions are also executable to instantiate a printing manager instance for each of the multiple client printing systems. The multiple client printing systems are associated with the administration account. The instructions are further executable to present a data structure including an object associated with each of the multiple client printing systems. The instructions are additionally executable to determine license usage data for the multiple client printing systems based on the printing manager instances. The instructions are also executable to present the license usage data.

A non-transitory tangible computer-readable medium storing computer executable code is also described. The executable code includes code for causing a computing device to create an administration account. The executable code also includes code for causing the computing device to instantiate a printing manager instance for each of the multiple client printing systems. The multiple client printing systems are associated with the administration account. The executable code further includes code for causing the computing device to present a data structure including an object associated with each of the multiple client printing systems. The executable code additionally includes code for causing the computing device to determine license usage data for the multiple client printing systems based on the printing manager instances. The executable code also includes code for causing the computing device to present the license usage data.

Systems and methods for operating multiple client printing systems are described herein. Efficiently operating client printing systems is one current problem, particularly for organizations that operate multiple client printing systems. For example, organizations that provide managed print services (MPS) may have to deal with a large number of client printing systems associated with businesses, organizations, schools, homes, etc. For instance, some organizations may offer information technology (IT) services including managed print services, where the organization provides installation and maintenance of one or more printers for client printing systems. In one example, an organization may provide managed print services for multiple businesses, where each business has a client printing system (e.g., network of one or more computing devices and one or more printers). The organization may utilize one or more computing devices to manage installation of printers and/or licensing of printing manager software for the client printing systems. However, a problem arises in that technology for deploying printing manager software and/or managing billing may be limited on a client printing system basis. For example, an organization may separately deploy printing manager software for each individual client printing system. Additionally or alternatively, the technology for licensing printing manager software may be limited to allocating a set number of printing manager software licenses for each client printing system. Furthermore, technology for billing in such arrangements may be limited in flexibility due to the limited flexibility in licensing.

The systems and methods disclosed herein may address one or more of these technological problems by providing improvements to the functioning of computing devices. For example, a computing device may be implemented to enable integration of multiple printing manager software instances for multiple client printing systems. Technologically integrating operation of multiple client printing systems may additionally or alternatively include providing a data structure (e.g., expandable/collapsible object list) that includes objects associated with each of the multiple client printing systems, direct determination of license usage over multiple client printing systems, and/or determining billing on the basis of licensed printers in multiple different client printing systems.

Various configurations of the systems and methods are now described with reference to the Figures. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods. In the Figures, some elements may be labeled with a number and a letter (e.g., printer(s) 106a), where the letter may indicate one element of a set of elements. When a corresponding number is used without a letter (e.g., printer(s) 106), the number may refer to one, some, any, or all of the set of elements.

FIG. 1 is a block diagram illustrating an example of a configuration of devices 100 for operating multiple client printing systems. The devices 100 include a computing device 102, one or more networks 108, and two or more client printing systems 110. Each of the client printing systems 110a-n may include one or more networks 109, one or more printers 106, and/or one or more remote computing devices 104. The remote computing device(s) 104 may communicate with the computing device 102 via one or more networks 108, 109. Examples of the network(s) 108, 109 may include one or more local area networks (LANs), one or more wide area networks (WANs), one or more personal area networks (PANs), one or more metropolitan area networks (MANs), the Internet, and/or combinations thereof.

One or more remote computing devices 104 may be configured to communicate with the network(s) 108, 109. Examples of the computing device 102 and/or the remote computing device(s) 104 may include servers, desktop computers, laptop computers, tablet computers, smartphones, tablet devices, etc. In some configurations, one or more other computing devices may communicate with the computing device 102 via the network(s) 108. For example, a computing device (not shown in FIG. 1) that is outside of the client printing systems 110 may communicate with the computing device 102 via the network(s) 108. For instance, a computing device of an organization that provides managed print services may remotely communicate with the computing device 102 to provide input for operating the client printing systems.

In some examples, the network(s) 109 may be one or more relatively small networks, where each includes fifty or fewer printers 106. In another implementation, the network(s) 109 may belong to a large organization where the network(s) 109 may include more than 50 printers, include different subnets, and/or may be spread across different geographic regions.

One challenge to operating printing systems is configuring printers 106 for one or more remote computing devices 104 on the network(s) 108 and/or network(s) 109. To properly utilize a printer 106, a remote computing device 104 may be configured with a printer driver and a printing profile. A printer driver may be software that converts data to be printed to a format specific for a printer 106.

A printing profile may include one or more settings for a printer 106. The one or more settings may include tray options, paper options, paper sizes, duplex options, dots-per-inch (DPI) settings, watermark options, name, comment, location, etc. Therefore, a printing profile may be a collection of customized printer settings or attributes.

As described above, one problem with printing systems is that each printing system corresponding to a client may be operated individually. This can be a time-consuming and inefficient process. For example, an organization (e.g., service provider) may provide technology and/or services for installing and/or maintaining printer functionality for multiple client printing systems 110. Due to a need to isolate access and/or control of different client printing systems, different client printing systems have not been accessible to operate from one interface. For example, different printing systems for different clients of MPS providers have been isolated due to security problems (e.g., a user from one client should not be able to access a printing system of another client), technical issues (e.g., different system configurations, different licensing for different clients), and/or billing issues (e.g., billing between clients is isolated). Some configurations of the systems and methods disclosed herein may provide operational control and/or access from one interface. For example, some configurations may provide security between client printing systems 110 while also allowing one or more authorized users to manage different client printing systems 110 from a single interface (e.g., without having to log in to different accounts corresponding to different client printing systems 110). Additionally or alternatively, some configurations may resolve technical issues of controlling different system configurations and/or different licensing between different client printing systems 110. Additionally or alternatively, some configurations may improve billing flexibility by enabling licensing to be consumed on a usage basis over multiple client printing systems.

The computing device 102 may host a website 111 that is accessible via the network(s) 108. The computing device 102 may include (e.g., store data and/or instructions in memory for) one or more printer definitions 112, a client printing system operator 113, a printer driver repository 122, a printing profile repository 126, an instantiator 127, an installer generator 130, and/or a deployment manager 134. Although illustrated as a single device, the computing device 102 may include multiple devices. For example, the computing device 102 could comprise one or more load-balancing routers, one or more web servers, one or more application servers, and/or one or more database servers in operable communication with each other.

In some configurations, the computing device 102 may include one or more displays, may be coupled to one or more displays, and/or may communicate with (e.g., send data to) one or more displays. The computing device 102 may present the website 111 and/or one or more user interfaces corresponding to the operations described herein. For example, the computing device 102 may render a user interface on a local display or may send data for a user interface to one or more other computing devices over one or more networks (e.g., network(s) 108, network(s) 109, etc.). In some approaches, the computing device 102 may send user interface (e.g., website 111) data to a computer being used by an administrator, service provider, or other user.

The printer driver repository 122 may store one or more printer drivers. The printing profile repository 126 may store one or more printing profiles. A printing profile may comprise one or more settings for a printer 106. For example, the one or more settings may include tray options, paper options, paper sizes, duplex options, dots-per-inch (DPI) settings, watermark options, name, comment, location, etc.

In some configurations, the client printing system operator 113 may create (via the website 111 and/or an application programming interface (API), for example), an administration account. An administration account may be data (e.g., object, structure, etc.) that enables a user to access and/or provide input for operating multiple client printing systems. For example, an administration account may provide visibility into all of the data (e.g., printer definitions 112, printer drivers, printing profiles, deployment rules, licensing, billing, access authorization, etc.) maintained by the computing device 102 that is associated with a set of client printing systems 110. In some configurations, the computing device 102 may receive data from a remote computing device to create the administration account. For example, a computing device of an organization associated with a set of client printing systems 110 may provide information for creating and/or editing the administration account. In some configurations, the client printing system operator 113 may create an administration account object in a data structure corresponding to the administration account. For example, the client printing system operator 113 may create an icon that represents the administration account in a list or other structure. When the administration account object is selected, the client printing system operator 113 may present (via the website 111 and/or an API, for example) data corresponding to the administration account. For example, the client printing system operator 113 may present a number of client printing systems 110 corresponding to the administration account. For instance, the client printing system operator 113 may present the number of client printing systems with a label (e.g., "Customer Count"). An example of an interface illustrating an administration account object (e.g., managed service provider (MSP) account, "MSP A") is given in connection with FIG. 3.

The instantiator 127 may instantiate (via the website 111 and/or an API, for example) a printing manager instance for each of a set of client printing systems 110. The set of (e.g., multiple) client printing systems 110 may be associated with the administration account. A "printing manager instance" may be an instance of printing manager software (e.g., printing cloud software, printing installer software, etc.) for managing a single client printing system 110. For example, a printing manager instance may manage the configuration of and/or information (e.g., printer definitions 112, printer drivers, printing profiles, installers, deployment rules, licenses, billing, etc.) of a single client printing system 110. In some configurations, the website 111 may receive an input indicating an instruction to create a new printing manager instance for a client printing system. In response to the command, the instantiator 127 may instantiate a printing manager instance.

In some configurations, the computing device 102 may share settings and/or resources across multiple printing manager (e.g., Printer Installer) instances. For example, the computing device 102 may provide an ability to share printer drivers across multiple printing manager instances (e.g., upload a printer driver once and use the printer driver in multiple printing manager instances). In some configurations, the computing device 102 may share one or more printer drivers and/or printer profiles across some or all client printing systems 110. This may allow uploading (by an MSP, for example) a driver and configuring profiles once at the MSP level, and then allowing assignment to printing manager instances. Additionally or alternatively, the computing device 102 may save settings (e.g., lightweight directory access protocol (LDAP) settings) in one place and apply the settings to multiple printing manager instances. In some configurations, the computing device 102 may set a global printing manager instance configuration and automatically apply the global printing manager instance configuration to (e.g., across) one or more printing manager instances and/or one or more new printing manager instances. For example, the global printing manager instance configuration may include LDAP setting(s), simple network management protocol (SNMP) setting(s), client configuration setting(s), printing configuration setting(s), and/or portal settings, etc.

Figure 4:
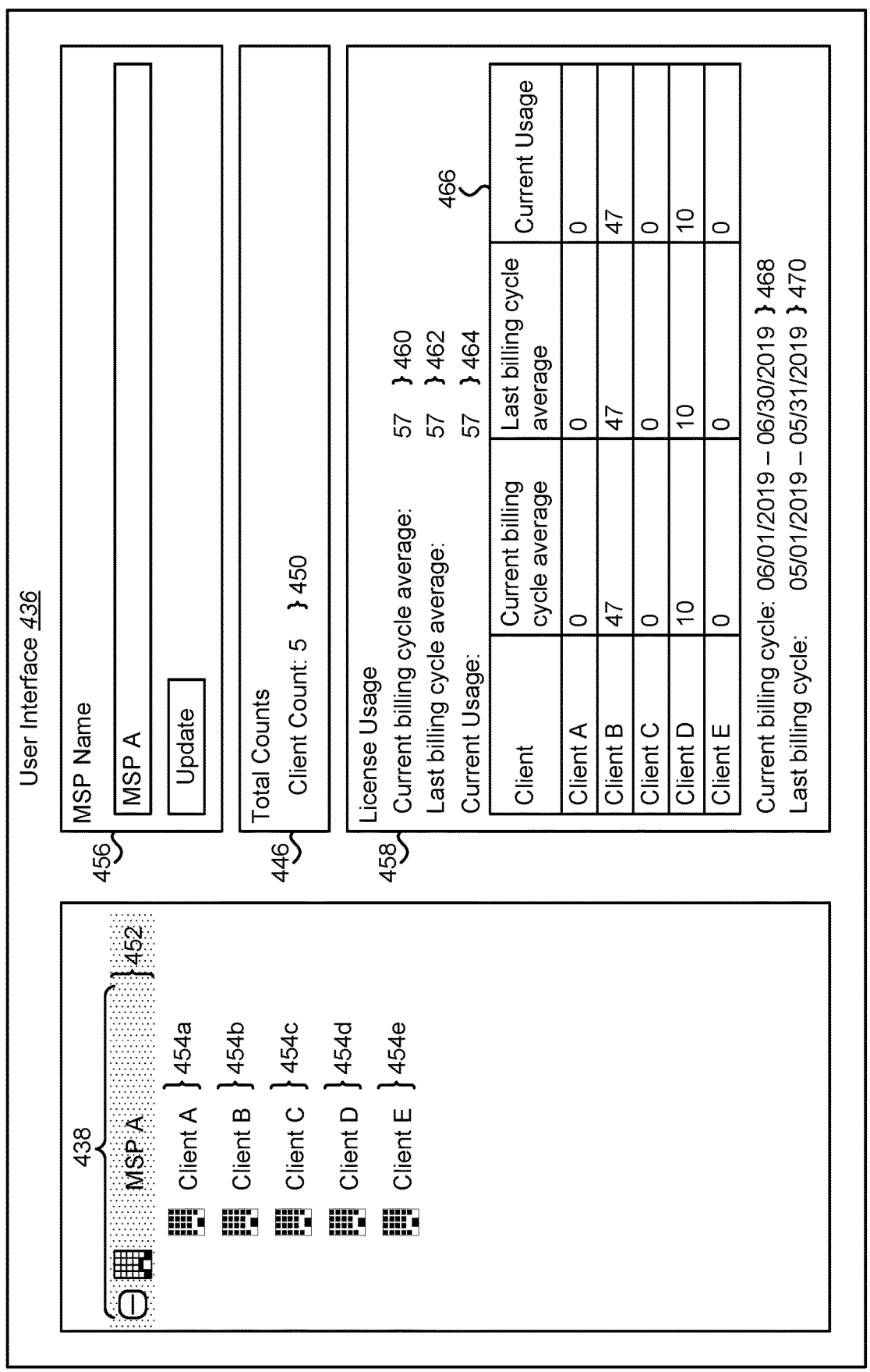
FIG. 4 is a diagram illustrating another example of a UI for interacting with a computing device configured to operate multiple client printing systems.

The client printing system operator 113 may present (via the website 111 and/or an API, for example) a data structure comprising an object associated with each of the multiple client printing systems 110. For example, objects in the data structure may be associated with each printing manager instance that corresponds to each client printing system 110. In some configurations, the data structure may be a list structure and/or tree structure. In some approaches, each of the objects associated with the multiple client printing systems may be associated with (e.g., branch from) an administration account object. For example, each of the objects may be included in a collapsible sub-list or branch associated with the administration account object. Some examples of objects associated with examples of client printing systems 110 are shown in FIG. 4. In particular, FIG. 4 illustrates examples of objects associated with client printing systems 110 (e.g., printing manager instances for each of the client printing systems 110). In that example, the objects may be a collapsible sub-list under the administration account object "MSP A."

The client printing system operator 113 may determine one or more folders for the data structure. One or more of the folder(s) may include one or more objects associated with one or more of the multiple client printing systems 110. For example, a folder may be utilized to organize and/or group one or more objects associated with one or more client printing systems 110. Examples of folders are illustrated in FIG. 7. Examples of determining and/or editing folders are given in connection with FIGS. 5-7. Folders may organize objects associated with client printing systems on variety of bases (e.g., different clients (such as different users, different businesses, for example), different entities, geographical region, work division, personnel responsibility, time, and/or other category).

The client printing system operator 113 may determine one or more user permissions. User permissions may grant or restrict access to one or more of the objects associated with one or more client printing systems and/or to one or more folders. For example, user permissions may define specific permissions that each individual user has.

An object associated with a client printing system 110 may provide access to the corresponding printing manager instance. For example, the client printing system operator 113 may allow, via the website 111 and/or an API, one or more of the objects and/or folders to be selected. For instance, the client printing system operator 113 may receive an input that indicates a selection of an object associated with a client printing system 110 (e.g., associated with a printing manager instance for the client printing system 110). The client printing system operator 113 may present (via the website 111 and/or an API, for example) data corresponding to the one or more selected objects.

In some configurations, the client printing system operator 113 may provide a log in function corresponding to one or more selected objects (e.g., corresponding to one or more printing manager instances). For example, the client printing system operator 113 may enable a one-click log in or automatic log in to one or more printing manager instances in a case that a current user (e.g., user account) has permission to log in to the printing manager instance(s).

In some configurations, the client printing system operator 113 may provide integrated access to and/or control of multiple printing manager instances associated with multiple client printing systems 110. For example, the client printing system operator 113 may enable navigation to and/or modification of printing configuration information for multiple printing manager instances associated with multiple client printing systems 110. This may enable integrated access to manage all client printing systems 110 for an administrator, service provider, or user. For example, this may avoid requiring an administrator, service provider, and/or user to separately log in to different printing manager instances for configuration, licensing, and/or billing purposes.

In some configurations, the client printing system operator 113 may determine license usage data for the multiple client printing systems 110 based on the printing manager instances. For example, the client printing system operator 113 may determine a number of installed printers for each of the multiple client printing systems 110. In some configurations, each of the printing manager instances may include, provide, and/or allow access to determine the number of installed printers for each respective client printing system 110a-n. In some examples, a license may be a license to utilize printing manager software (e.g., printing cloud software, printing installer software, etc.).

In some configurations, the client printing system operator 113 may determine a total number of installed printers for all of the client printing systems 110a-n. For example, the client printing system operator 113 may sum numbers of installed printers for the client printing systems 110. In some approaches, the client printing system operator 113 may poll each printing manager instance for the respective number of installed printers and add the resulting numbers to determine the total number of installed printers. The number of installed printers may indicate license usage data. For example, the client printing system operator 113 may determine a number of installed printers for each client printing system 110 and/or may determine a total number of installed printers over all of the client printing systems 110 (e.g., separate client printing systems 110 corresponding to separate clients). Additionally or alternatively, the client printing system operator 113 may determine license usage data based on user permissions. For example, the client printing system operator may determine license usage data corresponding to client printing systems 110 to which a user has access. In some configurations (e.g., in a micro service architecture), there may be no concrete instance that contains the number of installed printers in some configurations. The information may be spread out over the entire system (e.g., multiple client printing systems 110) in some approaches.

In some configurations, determining the license usage data may include determining a client average license usage for each of the client printing systems 110a-n for a billing cycle or a billing period. Additionally or alternatively, determining the license usage data may include determining a summary average license usage over all of the client printing systems 110a-n for the billing cycle or a billing period (e.g., a week, a month, a quarter, etc.). For example, the client printing system operator 113 may track the number of installed printers over a billing cycle (e.g., hourly, daily, weekly, when changed, etc.). The client printing system operator 113 may average the number of installed printers to determine the client average license usage and/or the summary average license usage. For example, the computing device 102 (e.g., client printing system operator 113) may average the number of installed printers over time (e.g., may sample a number of installed printers daily and average the samples at the end of a month). This may simplify license usage tracking and/or billing for administration accounts by integrating license usage over multiple printing manager instances. In some configurations, this may allow licenses to be efficiently and flexibly allocated, where a fixed number of licenses does not need to be set up in advance for each client printing system. Accordingly, a license may be issued for each installed printer 106 in the client printing systems according to each printing manager instance. In some approaches, the number(s) of installed printer(s) and/or averages may be based on user permissions, indicating those client printing systems to which a user (e.g., user account) has access.

The client printing system operator 113 may present, via the website 111 and/or an API, the license usage data. For example, the client printing system operator 113 may present a current number of licenses (for installed printers, for example) and/or one or more billing cycle averages. In some examples, a current number of licenses may be broken out for one or more of the client printing systems 110a-n and/or may include one or more totals (e.g., a total for all client printing systems 110a-n and/or a selected subset of the client printing systems 110a-n). An example of license usage data is given in connection with FIG. 4.

The client printing system operator 113 may generate a bill for the billing cycle for the administration account based on the license usage. For example, the client printing system operator 113 may determine a charge for a client average license usage and/or for the summary average license usage over all of the multiple client printing systems. In some approaches, the computing device 102 may send the bill to another computing device (e.g., a computing device for the administration account) via the network(s) 108. Additionally or alternatively, the client printing system operator 113 may print the bill (for sending a hard copy, for example). In some configurations, the client printing system operator 113 may generate one or more bills for individual client printing systems 110a-n, where each bill indicates a share of the license usage for each respective client printing system 110a-n. In some examples, the computing device 102 may automatically send a bill, bills, and/or billing information based on the license usage (e.g., summary average license usage). For example, the computing device 102 may send billing information via an email, text message notification, website, API, automatic bill payment request, paper invoice, etc., to a MPS organization and/or to one or more clients corresponding to the client printing system(s) 110a-n.

In some configurations, one or more of the operations described herein may be performed via the website 111 and/or an API. For example, a service provider or user may provide input that may be sent to the computing device 102 via the website 111 and/or an API. The computing device 102 may utilize the input to perform one or more operations. For example, the computing device 102 may receive data (e.g., account name, financial information, billing information, contact information, etc.) for creating the administration account. Additionally or alternatively, the website 111 may receive data (e.g., client printing system name, number of printers, type of printers, printer definition information, deployment rules etc.) for instantiating and/or editing a printing manager instance.

In some configurations, each printing manager instance may perform one or more of the following operations described for installing and/or maintaining printers 106 for each client printing system. For example, the computing device 102 may determine a printer driver for a printer. For example, the computing device 102 may determine a printer driver to be used for a printer during printer definition 112 creation and/or editing. In some configurations, the computing device 102 may receive an input (via an input device and/or the network(s) 108) indicating a printer driver for a printer. In some configurations, the computing device 102 may automatically detect a printer 106 and determine a printer driver associated with the printer.

In some configurations, the computing device 102 may determine at least one printing profile for a printer 106. In some configurations, the computing device 102 may determine a selected printing profile for the printer 106. For example, the computing device 102 may receive an input (via an input device and/or the network(s) 108) indicating a selection of a printing profile for the printer 106. In some approaches, a printing profile reference corresponding to the selected printing profile may be included in a printer definition 112 (when creating and/or editing a printer definition 112 for the printer 106, for example). The printing profile reference may be utilized to apply settings (e.g., default settings) to the printer 106 when the printer (e.g., printer driver) is installed and/or configured on one or more remote computing devices 104. In some configurations, printer definition 112 creation and/or printer installation may be performed in accordance with the following.

In some configurations, the computing device 102 may create a printer definition 112 for one or more printers 106. A printer definition 112 may comprise a network address, one or more printer driver references, one or more printing profile references and one or more install uniform resource identifiers (URI). In an implementation, the network address may be an Internet Protocol (IP) address of the printer 106. In another implementation, the network address may include a hostname of the printer 106.

The printer driver reference may uniquely identify a printer driver stored in the printer driver repository 122. The printing profile reference may uniquely identify a printing profile stored in the printing profile repository 126.

The install URI may specify an access mechanism and a location for downloading an installer generated by the installer generator 130. In an implementation, the install URI may include a Uniform Resource Locator (URL) or Uniform Resource Name (URN) that identifies the computing device 102 as a source for an installer or deployment rules to configure a printer 106.

In some configurations, a service provider may utilize a SaaS deployment of printer drivers and printing profiles to simplify the delivery of print services to an organization. An example of a service provider includes a managed print services (MPS) that provides print services to a user (e.g., customer). Another example of a service provider is an information technology (IT) administrator that provides IT services to an organization.

In some configurations, a service provider may use a computing device (e.g., a remote computing device 104 or another computing device) to access a website 111 hosted by the computing device 102 via the network(s) 108. The service provider may use the website 111 to create a printer definition 112 for a printer 106 that has been or will be provided to a user. The service provider may specify a network address (e.g., IP address or hostname) for a printer 106. The service provider may upload one or more printer drivers for the printer 106. This may include separate printer drivers for different operating systems (e.g., Microsoft Windows, Mac OS X, Linux, etc.), different versions of operating systems (e.g., Windows XP, Windows Vista, Windows 7, Windows 8, Windows 10, etc.), and different computing systems (e.g., 32-bit, 64-bit, etc.), etc. In some configurations, the computing device 102 may create one or more printing profiles based on user (e.g., service provider) input.

In some configurations, after creating the printer definition 112, the computing device 102 may enable installing a printer and/or changing printer settings in accordance with a printing profile. For example, the computing device 102 may determine a printer driver for the printer 106, which may enable determination and/or selection of a printing profile for the printer 106.

In some configurations, the computing device 102 may provide either an installer or deployment rules to configure a remote computing device 104 to communicate with the printer 106 using the printer definition 112. In some implementations, the computing device 102 may include an installer generator 130.

The installer generator 130 may generate an installer based on a printer definition 112. The installer may be run by a remote computing device 104. Running the installer may configure the remote computing device 104 to communicate with a printer 106. Configuring the remote computing device 104 to communicate with the printer 106 may comprise creating a network printer port based on the network address in the printer definition 112, installing the printer driver referenced in the printer definition 112, and configuring settings for the printer 106 based on the printing profile referenced in the printer definition 112.

In some configurations, the computing device 102 may send an install URI to the remote computing device 104 via the network(s) 108. In an implementation, the install URI may be sent in an email, a text message, an instant message, etc. In another implementation, the install URI may be added to a deployment rule.

The install URI may be activated on a remote computing device 104. For example, a user may click on a link in an email. The remote computing device 104 may send an indication to the computing device 102 that the install URI has been activated by the user.

The computing device 102 may generate an installer based on the printer definition 112 and send the installer to the remote computing device 104. In some configurations, the installer is generated when the computing device 102 receives the indication. In other configurations, the computing device 102 generates the installer prior to receipt of the indication. Activating the install URI may cause the remote computing device 104 to download the installer.

The remote computing device 104 may next prompt the user to run the installer. The installer may create a network printer port on the remote computing device 104 based on the network address, install the printer driver, and configure the settings for the printer 106 based on the printing profile. After the installer has completed, the remote computing device 104 may be configured to communicate with the printer 106 over the network(s). In other words, the remote computing device 104 may be configured to print using the printer 106.

In another approach, the computing device 102 may include a deployment manager 134 that may communicate with a printer cloud client on a remote computing device 104. The printer cloud client may be a software agent that exists on a remote computing device 104. The printer cloud client may be configured to communicate with the computing device 102 via the network(s) 108. In this example, the remote computing device 104 includes the printer cloud client. It should be noted that the printer cloud client may be included on one or more (e.g., all or not all) of the remote computing devices 104.

The deployment manager 134 may generate deployment rules for a given printer 106 based on the printer definition 112. Deployment rules may be assigned to printers 106 and are used to determine if a printer driver or printing profile should be installed on the remote computing device 104. These deployment rules may be created based on input from an administrator, service provider, and/or user and associated with the printer definition 112 of a given printer 106.

In an implementation, the deployment rules can target a specific hostname, group of users, a range of IP address, MAC address or an Active Directory container, organizational unit (OU), computer, user, group, etc. The deployment manager 134 may include targeting rules to determine which computing devices 104 should have a printer 106 installed. On the computing device 102, an administrator may assign a deployment rule to the defined printer 106 and/or profile. When the printer cloud client checks in with the computing device 102, the printer cloud client may consider the deployment rules. If a deployment rule applies to the remote computing device 104 or user, the printer driver and printing profile may be installed.

The computing device 102 may send the deployment rules to the printer cloud client. The deployment rules may include instructions for the printer cloud client to install and configure a printer driver and printing profile for a given printer 106. In an implementation, the deployment rules may include information included in a printer definition 112. For example, the deployment rules may include an install URI.

In an implementation, the printer definition 112 may include a list of remote computing devices 104 that are to be configured to communicate with a given printer 106. For example, a service provider may indicate, via the website 111 and/or an API, which computing devices 104 should be configured to print to a given printer 106. The computing device 102 may maintain a list of these computing devices 104 in the printer definition 112.

After creating the printer definition 112 for the printer 106, the computing device 102 may send the deployment rules to the printer cloud client. For example, the computing device 102 may send an install URI to the remote computing device 104 via the network(s) 108. In an implementation, the computing device 102 may only send the deployment rules to the printer cloud client that requests them. One or more printer cloud clients may check in with the computing device 102 for things to do on a configurable basis.

Upon receiving the deployment rules, the printer cloud client may create a network printer port on the remote computing device 104 based on the network address. The printer cloud client may also contact the computing device 102 to acquire a printer driver and a printing profile for the printer 106. The printer cloud client may install the printer driver, and configure the settings for the printer 106 based on the printing profile. After the printer cloud client has completed, the remote computing device 104 may be configured to communicate with the printer 106 over the network(s) 108. In other words, the remote computing device 104 may be configured to print using the printer 106.

In this implementation, rather than have an end-user to click an email or go to a portal and select to install the printer 106, the printer cloud client may perform the printer driver installation and configuration.

The systems and methods described herein may be beneficial with service providers that provide print services for a number of organizations. For example, the client printing system operator 113 may integrate access, configuration, licensing, and/or billing functions across multiple client printing systems 110. For example, some configurations may enable a user to view and/or modify information for multiple client printing systems (associated with customers, for example) in a single portal. In some configurations, for example, a user may log in to a portal (with a UI, for instance), which may provide access to multiple printer management instances corresponding to multiple client printing systems (without having to individually log in to each printer management instance). For example, the computing device 102 (e.g., client printing system operator 113) may provide access (e.g., concurrent access) to the printing manager instances corresponding to the client printing systems 110*a-n* to install, configure, uninstall, deploy, and/or manage, etc., printer(s) 106 across multiple client printing systems 110*a-n*. This may improve computing device functionality by providing a unified interface to multiple printing manager instances.

Figure 2:
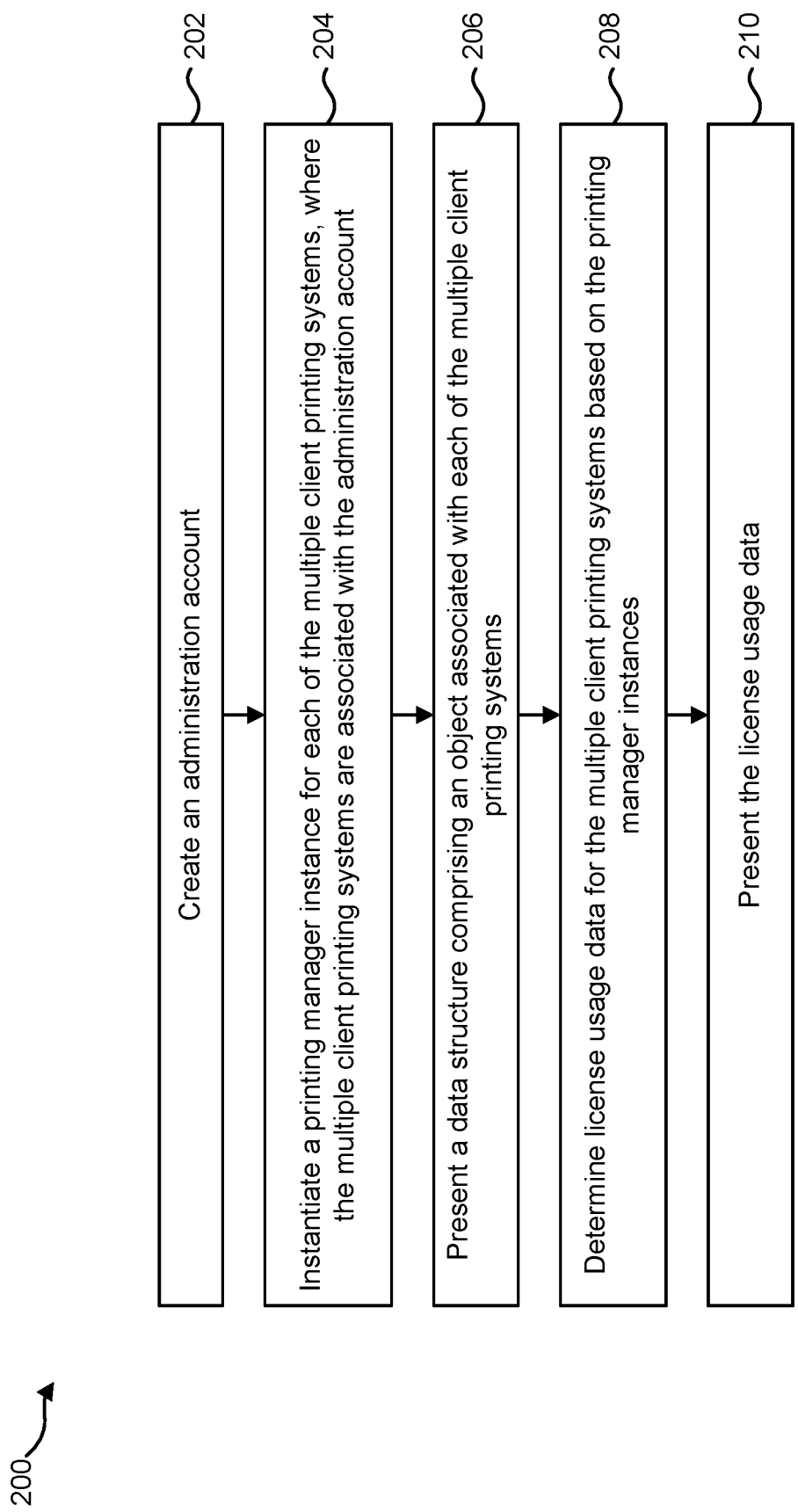
FIG. 2 is a flow diagram illustrating one configuration of a method for operating multiple client printing systems.

FIG. 2 is a flow diagram illustrating one configuration of a method 200 for operating multiple client printing systems.

In some configurations, the method may be performed by the computing device 102 described in connection with FIG. 1.

The computing device 102 may create 202 (via a website 111 and/or an application programming interface (API), for example) an administration account. This may be accomplished as described in connection with FIG. 1. In some configurations, administration accounts may be created via an API call from a remote computing device to the computing device 102 (e.g., from a salesforce computing device to a customer management portal (CMP)).

The computing device 102 may instantiate 204 (via the website 111 and/or an API, for example) a printing manager instance for each of the multiple client printing systems. This may be accomplished as described in connection with FIG. 1. In some configurations, a printing manager instance (e.g., PrinterCloud instances, Printer Installer (PI) instances, etc.) may be created through an API. For example, managed service providers (MSPs) may utilize a remote computing device to create an instance via a website, and non-MSP PrinterCloud instances may be created through an API in some approaches. Additionally or alternatively, an MSP may use an API to create instances through the API. The multiple client printing systems may be associated with the administration account.

The computing device 102 may present 206 (via the website 111 and/or an API, for example) a data structure comprising an object associated with each of the multiple client printing systems (e.g., each of the printing manager instances). This may be accomplished as described in connection with FIG. 1. In some configurations, the data structure may be presented through an API. For example, some functionality (e.g., all CMP functionality) may be integrated with a third party management tool. Accordingly, some functionality may be presented via APIs.

The computing device 102 may determine 208 license usage data for the multiple client printing systems based on the printing manager instances. This may be accomplished as described in connection with FIG. 1. For example, the computing device 102 may determine a number of printers (e.g., installed printers) for each client printing system and/or a total number of printers for a set of client printing systems.

The computing device 102 may present 210 (via the website 111 and/or an API, for example) the license usage data. This may be accomplished as described in connection with FIG. 1. For example, the computing device 102 may display the license usage data on a screen and/or may send the license usage data to another computing device for output. In addition to or alternatively from providing the license usage data via the website 111, the license usage data may be provided through an API. For example, a sales force computing device may use the API. In some configurations, the API may be accessible by MSP users and/or third party administration consoles.

Figure 3:
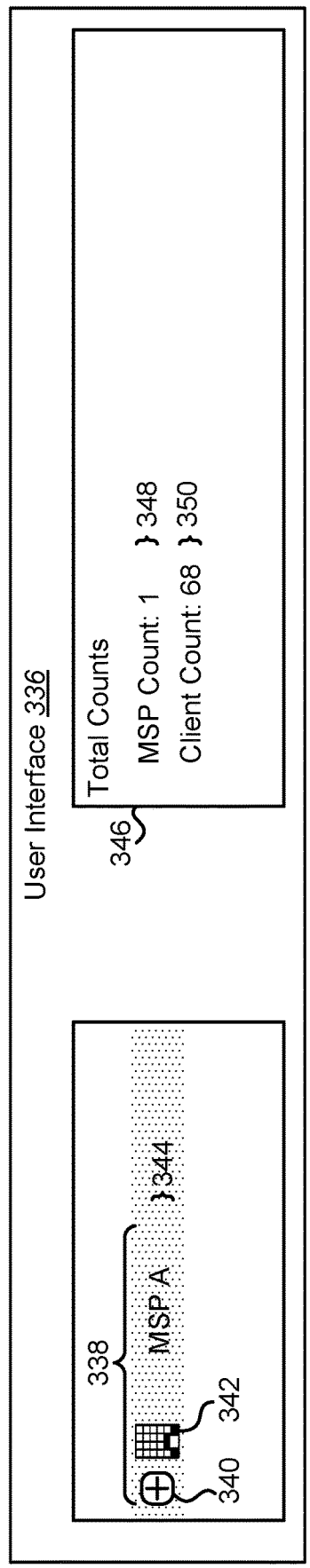
FIG. 3 is a diagram illustrating an example of a user interface (UI) for interacting with a computing device configured to operate multiple client printing systems.

FIG. 3 is a diagram illustrating an example of a UI 336 for interacting with a computing device configured to operate multiple client printing systems. The UI 336 may be presented by a computing device (e.g., computing device 102, remote computing device 104). For example, the UI 336 may be presented and/or accessed via a website and/or an API.

In particular, FIG. 3 illustrates an example of a data structure 338. The data structure 338 includes an administration account object with a control 340 (e.g., expansion/collapse control), an icon 342, and a name 344. In this example, the name 344 of the administration account object is "MSP A." In this example, the administration account object is part of the data structure 338, which may be a tree structure or a list structure. The data structure may be expandable and/or collapsible. For instance, the control 340 may be activated via an interface device (e.g., mouse, touch screen, controller, etc.) to expand and show one or more objects associated with one or more client printing systems. In some examples, the administration account object may include or be associated with objects for client printing systems.

In this example, the UI 336 includes a counts panel 346. The counts panel 346 may display one or more counts in association with the data structure 338. In this example, the administration account object is selected, which may cause the UI 336 to show a number 348 of administration accounts (e.g., 1), and a number 350 of client printing systems (e.g., 68) with a label (e.g., "Client Count").

FIG. 4 is a diagram illustrating another example of a UI 436 for interacting with a computing device configured to operate multiple client printing systems. The UI 436 may be presented by a computing device (e.g., computing device 102, remote computing device 104). For example, the UI 436 may be presented and/or accessed via a website and/or an API.

The example illustrated in FIG. 4 illustrates a data structure 438. In particular, FIG. 4 illustrates some examples of objects 454a-e associated with some client printing systems. Each of the objects 454a-e may be presented with an icon and a name (e.g., "Client A," "Client B," "Client C," "Client D," and "Client E"). The examples of the objects 454a-e may be associated with printing manager instances for each of the client printing systems. In this example, an administration account object 452 "MSP A" has been expanded to show the objects 454a-e associated with client printing systems corresponding to the administration account.

In this example, the UI 436 also illustrates interface objects (e.g., panels, fields, and a button). In particular, the UI 436 includes an administration account name panel 456 with a text field and a button to enable a computing device to update the name of the administration account. A counts panel 446 is also illustrated, which shows a number 450 of client printing systems with a label (e.g., "Client Count"). The number 450 corresponds to the objects 454a-e (associated with client printing systems) in the data structure 438 of the UI 436.

In this example, the UI 436 includes a license usage panel 458. The license usage panel 458 shows a total current number 464 of licenses (e.g., installed printers) corresponding to all of the client printing systems associated with the administration account. The license usage panel 458 also shows averages 462, 460 (determined by a computing device) of summary average license usage over all of the client printing systems (e.g., printing manager instance) for a previous billing cycle 470 and a current billing cycle 468. In particular, the license usage panel shows a current billing cycle average 460 and a last billing cycle average 462 for all of the client printing systems. The license usage panel 458 also shows individual details 466 of license usage broken out in rows of a table for client printing systems.

It should be noted that although FIG. 4 illustrates one example of a license usage panel 458 or dialog, other examples may be implemented. In another example, only averages may be listed in the license usage panel 458 at a particular level (e.g., MSP level). More details may be displayed in the license usage panel 458 at a lower level (e.g., client printing system level, small-and-medium-sized business (SMB) level), etc.). Accordingly, different levels of detail (e.g., whether averages are presented) may depend on the level selected in the data structure. In some examples (e.g., in another implementation of a customer management portal), billing information, averages, and/or details, etc., may be presented at the folder level. In some configurations, billing information may be presented based on user permissions. For example, a user (e.g., user account) may only access (e.g., view) billing information (aggregated and/or specific billing information, for instance) based on corresponding user permissions (e.g., based on the instances and folders that they are permitted to view).

Figure 5:
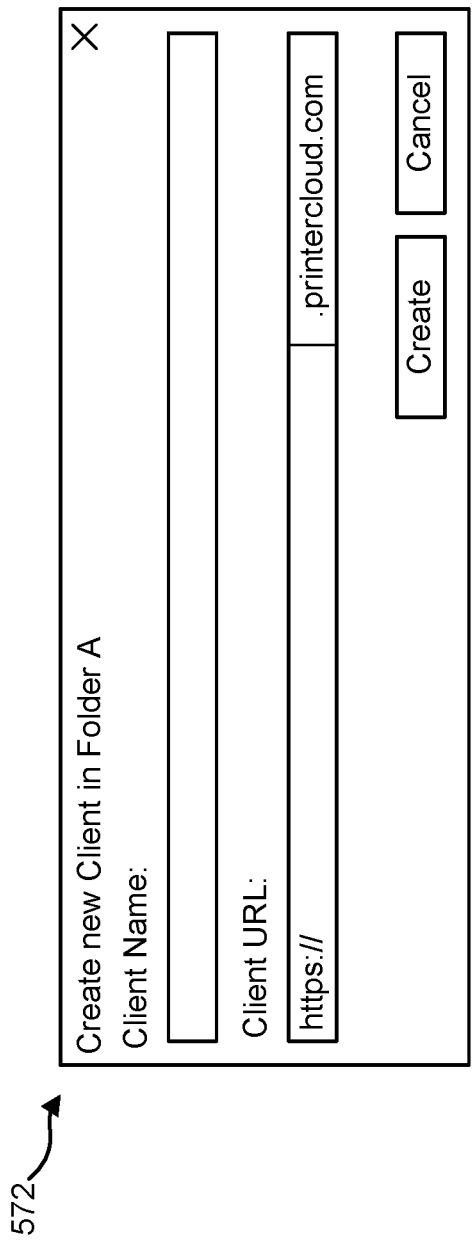
FIG. 5 is a diagram illustrating another example of a UI for interacting with a computing device configured to operate multiple client printing systems.

FIG. 5 is a diagram illustrating another example of a UI 572 for interacting with a computing device configured to operate multiple client printing systems. The UI 572 may be presented by a computing device (e.g., computing device 102, remote computing device 104). For example, the UI 572 may be presented and/or accessed via a website and/or an API.

In particular, FIG. 5 illustrates a dialog box for creating a new object associated with a client printing system. Specifically, a name field may be utilized to name the new client printing system. A client uniform resource locator (URL) field may be utilized to specify a uniform resource locator to access controls and/or settings for the client printing system. For example, when the computing device 102 receives the information from the text fields in the dialog box (when the create button is selected, for example), an instantiator (e.g., instantiator 127) may instantiate a new instance of a printing manager for the client printing system. The computing device 102 may also create an object associated with the client printing system in the data structure. As illustrated in FIG. 5, the object associated with the client printing system may be created in a folder (e.g., "Folder A") in the data structure in some cases. In some configurations, the UI 572 may be a pop-up dialog that appears in a foreground on top of another UI (e.g., UI 436).

Figure 6:
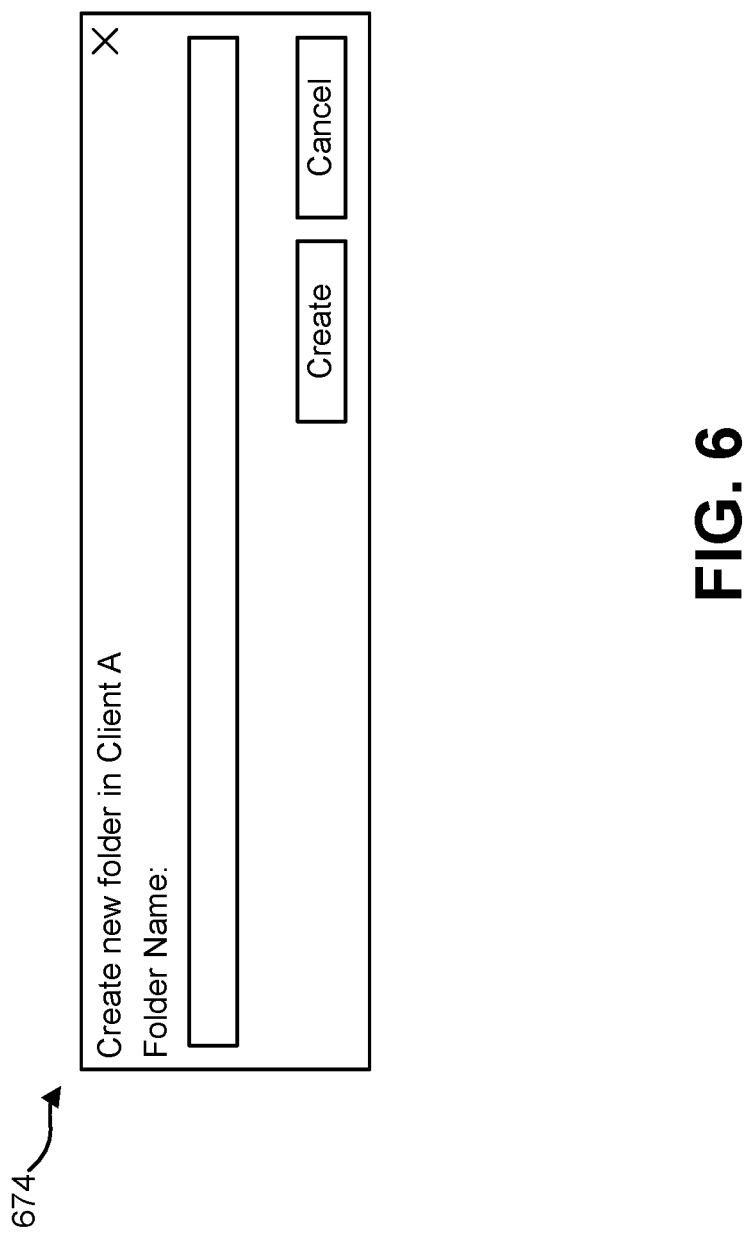
FIG. 6 is a diagram illustrating another example of a UI for interacting with a computing device configured to operate multiple client printing systems.
Figure 7:
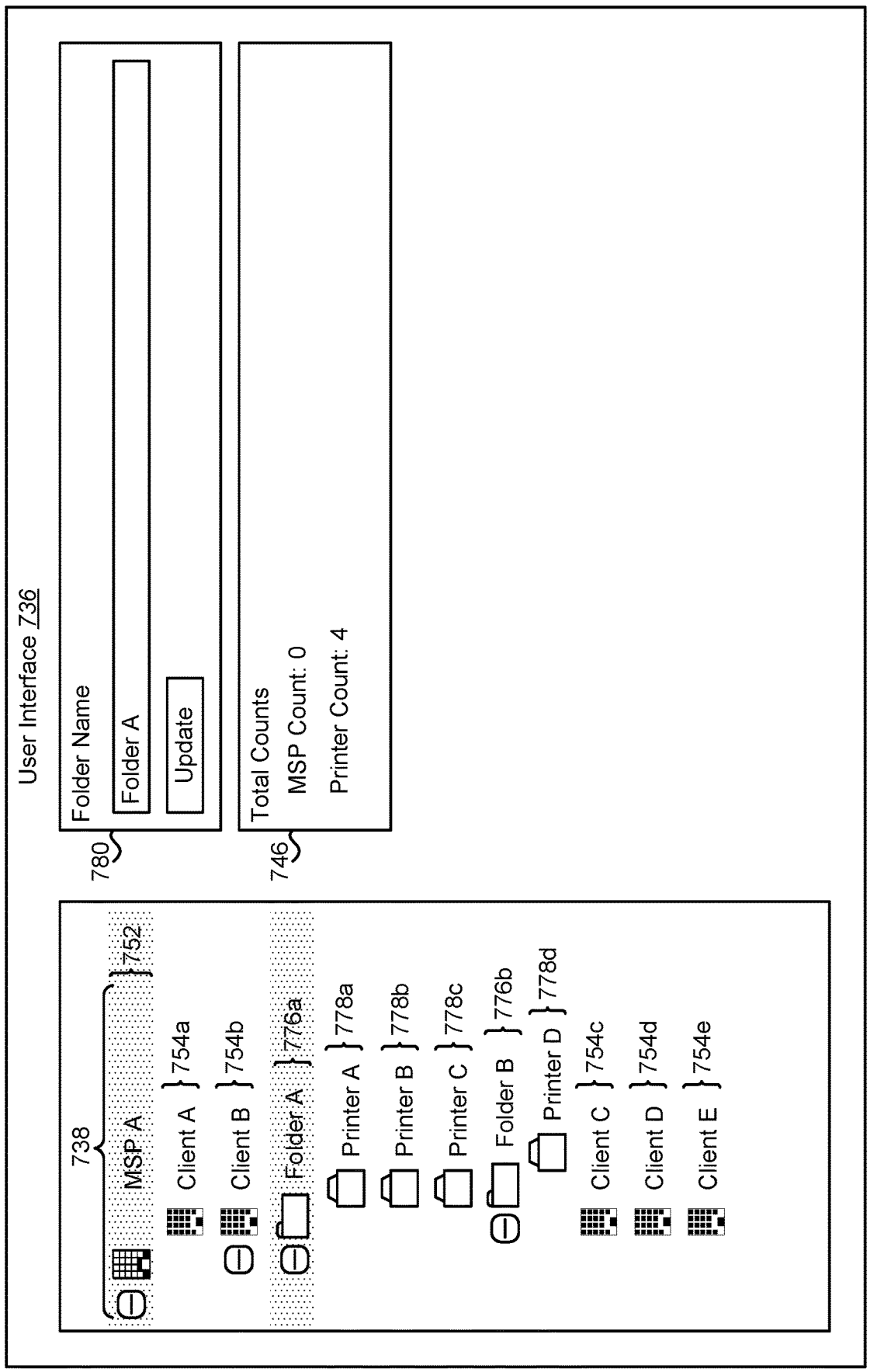
FIG. 7 is a diagram illustrating another example of a UI for interacting with a computing device configured to operate multiple client printing systems.

FIG. 6 is a diagram illustrating another example of a UI 674 for interacting with a computing device configured to operate multiple client printing systems. The UI 674 may be presented by a computing device (e.g., computing device 102, remote computing device 104). For example, the UI 572 may be presented and/or accessed via a website and/or an API.

In particular, FIG. 6 illustrates a dialog box for creating a new folder in the data structure. Specifically, a folder name field may be utilized to name the folder. For example, when the computing device 102 receives the information from the text field in the dialog box (when the create button is selected, for example), the client printing system operator 113 may create a new folder in the data structure. Depending on a selection in the data structure, the folder may be added to a sub-list of the administrative account object and/or to a sub-list of an object associated with a client printing system. The data structure may provide drag-and-drop functionality such that the administration object(s), and/or objects associated with client printing systems may be moved into a folder, out of a folder, between folders, etc. The drag-and-drop functionality may also be utilized to change the data structure (e.g., change which sub-list a folder is in).

FIG. 7 is a diagram illustrating another example of a UI 736 for interacting with a computing device configured to operate multiple client printing systems. The UI 736 may be presented by a computing device (e.g., computing device 102, remote computing device 104). For example, the UI 736 may be presented and/or accessed via a website and/or an API.

In particular, FIG. 7 shows a more specific example of the data structure 738 (in the left panel, for example). As illustrated in FIG. 7, the data structure 738 may be a tree or list with one or more collapsible and/or expandable branches or sub-lists. The data structure 738 may include one or more administrative account objects (e.g., administrative account object 752), objects 754a-e associated with client printing systems, folders 776a-b, and/or printer objects 778a-d. In this example, a control (e.g., expansion/collapse control) may be utilized with an object 754b for client B. Similar controls may be utilized for folders in the data structure 738.

As illustrated in FIG. 7, the UI 736 may include a folder name panel 780 that may include control to name and/or update a folder name of a selected folder. The UI 736 may show information (e.g., client printing system counts, administrative account count, licensing usage information, editing panels, etc.) based on a selection of the object(s) in the data structure. For example, a counts panel 746 may show a number of printer objects (that may correspond to actual printers, for instance) in a selected folder and sub-folders of the selected folder.

Figure 8:
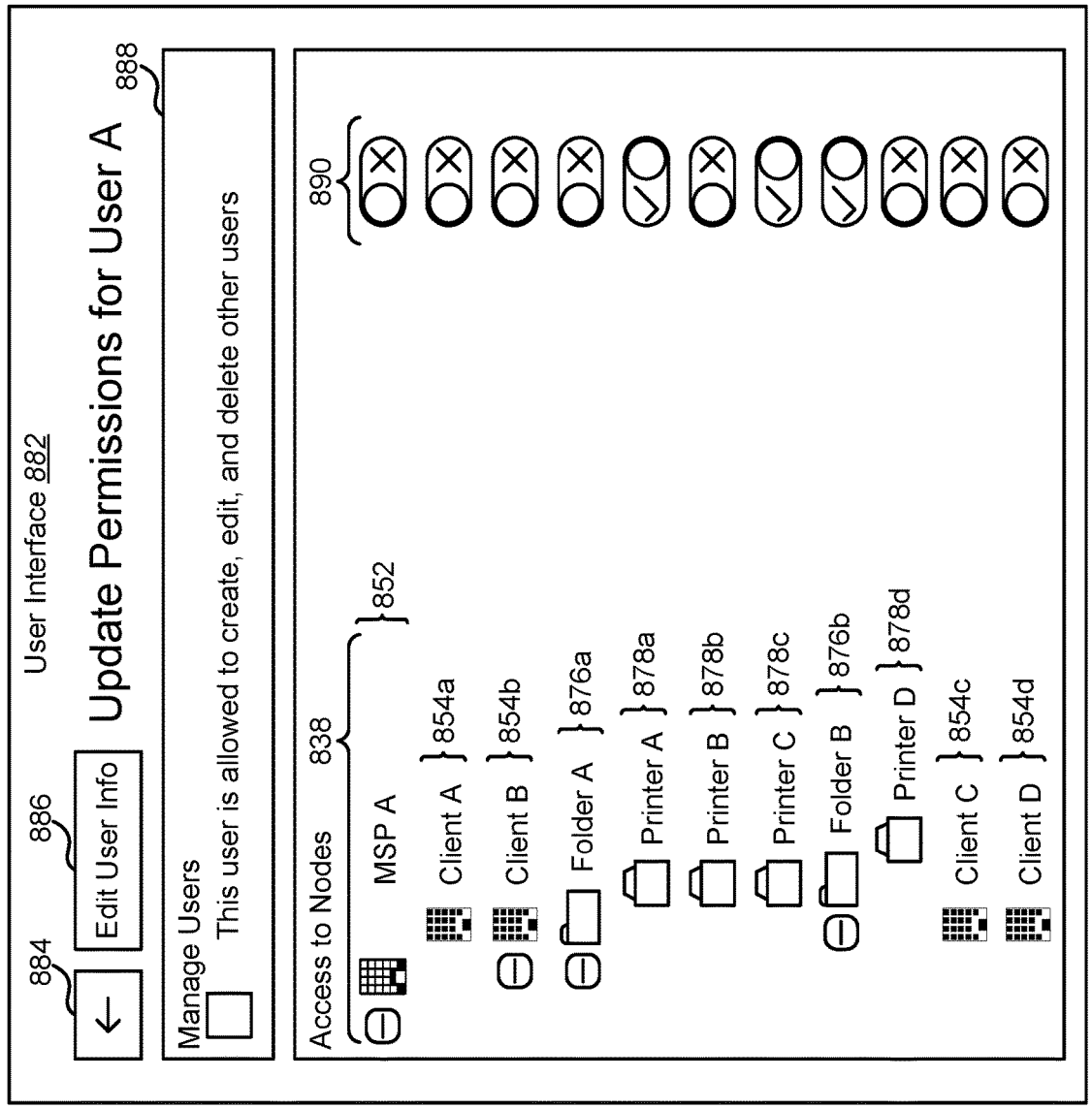
FIG. 8 is a diagram illustrating another example of a UI for interacting with a computing device configured to operate multiple client printing systems.

FIG. 8 is a diagram illustrating another example of a UI 882 for interacting with a computing device configured to operate multiple client printing systems. The UI may be presented by a computing device (e.g., computing device 102, remote computing device 104). For example, the UI 736 may be presented and/or accessed via a website and/or an API.

In particular, FIG. 8 illustrates a UI 882 for updating user permissions. For example, a user account for a (e.g., technician, end user, etc.) may have permissions data that dictates which nodes of the data structure 838 may be accessed. For instance, the UI 882 may enable allowing or restricting access to one or more nodes (e.g., an administration account object 852, objects 854a-d associated with client printing systems, folders 876a-b, and/or printers 878a-d, etc.) of the data structure 838. Accordingly, the permissions for a user account (e.g., for User A in FIG. 8) may be utilized to determine which nodes of the data structure 838 are presented for the user account and/or may determine which printing manager instances may be accessed via the user account. Additionally or alternatively, the permissions for a user account may be utilized to determine whether information (e.g., license usage information, billing information, configuration information, etc.) will be presented for a user account.

In the example illustrated in FIG. 8, the UI 882 includes controls 890 that may be selected to activate or deactivate user permissions corresponding to nodes of the data structure 838. In this example, User A has permission to access the object for printer A 878a, the object for printer C 878c, and folder B 876b.

In some configurations, the UI 882 may include a user administration panel 888. For example, the UI 882 and/or the user administration panel 888 may include a control (e.g., checkbox) for specifying where a user account is allowed to create, edit, and/or delete other user accounts. In some configurations, the UI 882 may include a control 886 (e.g., button) for editing user information and/or a control 884 (e.g., back button) for navigation. For instance, activating the control 886 may switch to and/or open the UI 990 described in connection with FIG. 9 for updating or editing a user account and/or information in some examples.

Figure 9:
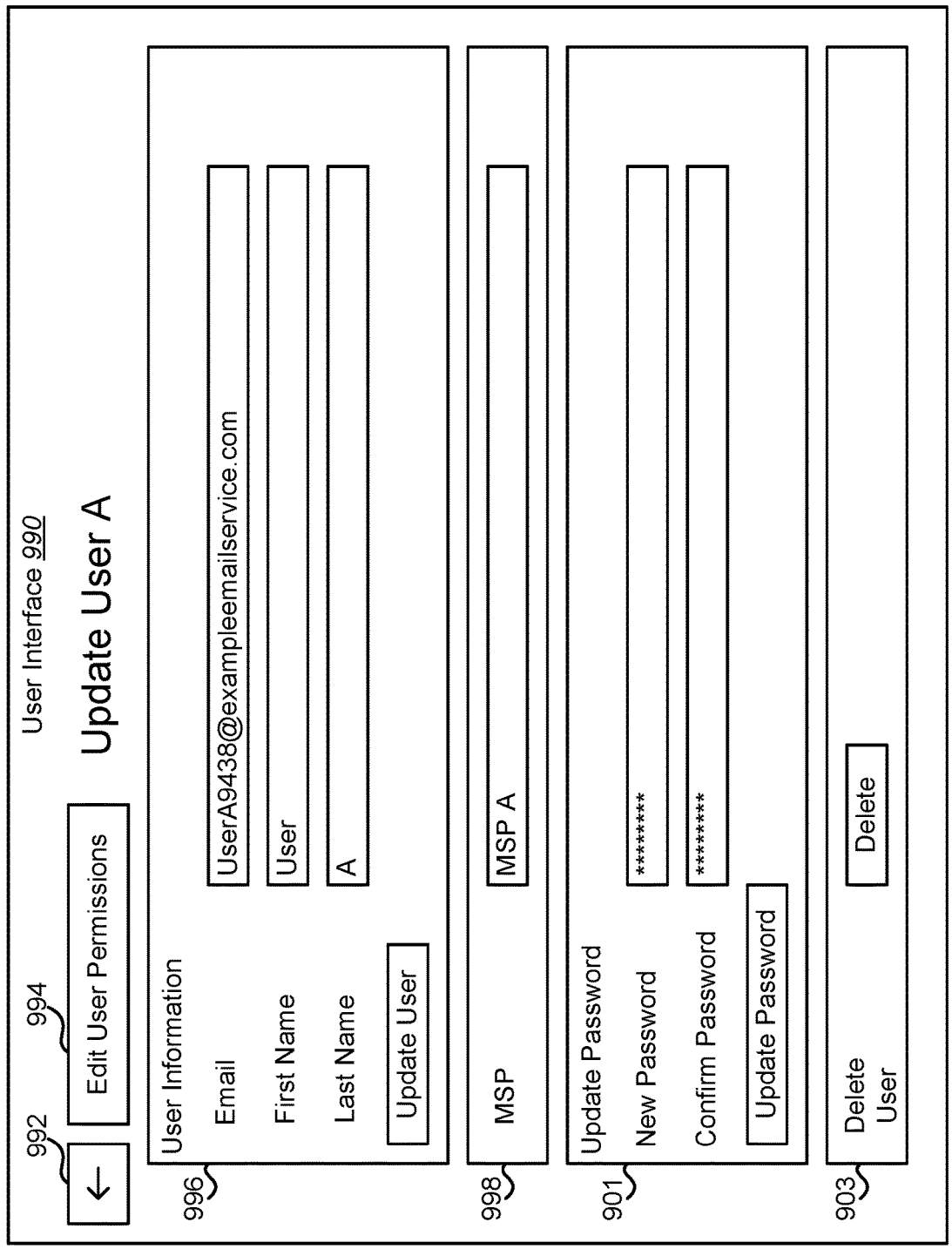
FIG. 9 is a diagram illustrating another example of a UI for interacting with a computing device configured to operate multiple client printing systems.

FIG. 9 is a diagram illustrating another example of a UI 990 for interacting with a computing device configured to operate multiple client printing systems. The UI may be presented by a computing device (e.g., computing device 102, remote computing device 104). For example, the UI 990 may be presented and/or accessed via a website and/or an API.

In particular, FIG. 9 illustrates another UI 990 for updating a user account. As illustrated in FIG. 9, the UI 990 may include a user information panel 996 with controls (e.g., fields and a button) for specifying an email address, first name, and last name of a user. The UI 990 may include an MSP panel 998 for specifying (e.g., selecting) an associated administration account. For example, the MSP panel 998 many include a drop-down list for selecting an administration account. The UI 990 may include a password panel 901, which may include controls (e.g., fields and a button) for specifying and/or updating a password for a user account. A deletion panel 903 may include a control (e.g., button) for deleting a user account. In some configurations, the UI 990 may include a control 994 (e.g., button) for editing user permissions and/or a control 992 (e.g., back button) for navigation. For instance, activating the control 994 may switch to and/or open the UI 882 described in connection with FIG. 8 for updating or editing user permissions in some examples.

Figure 10:
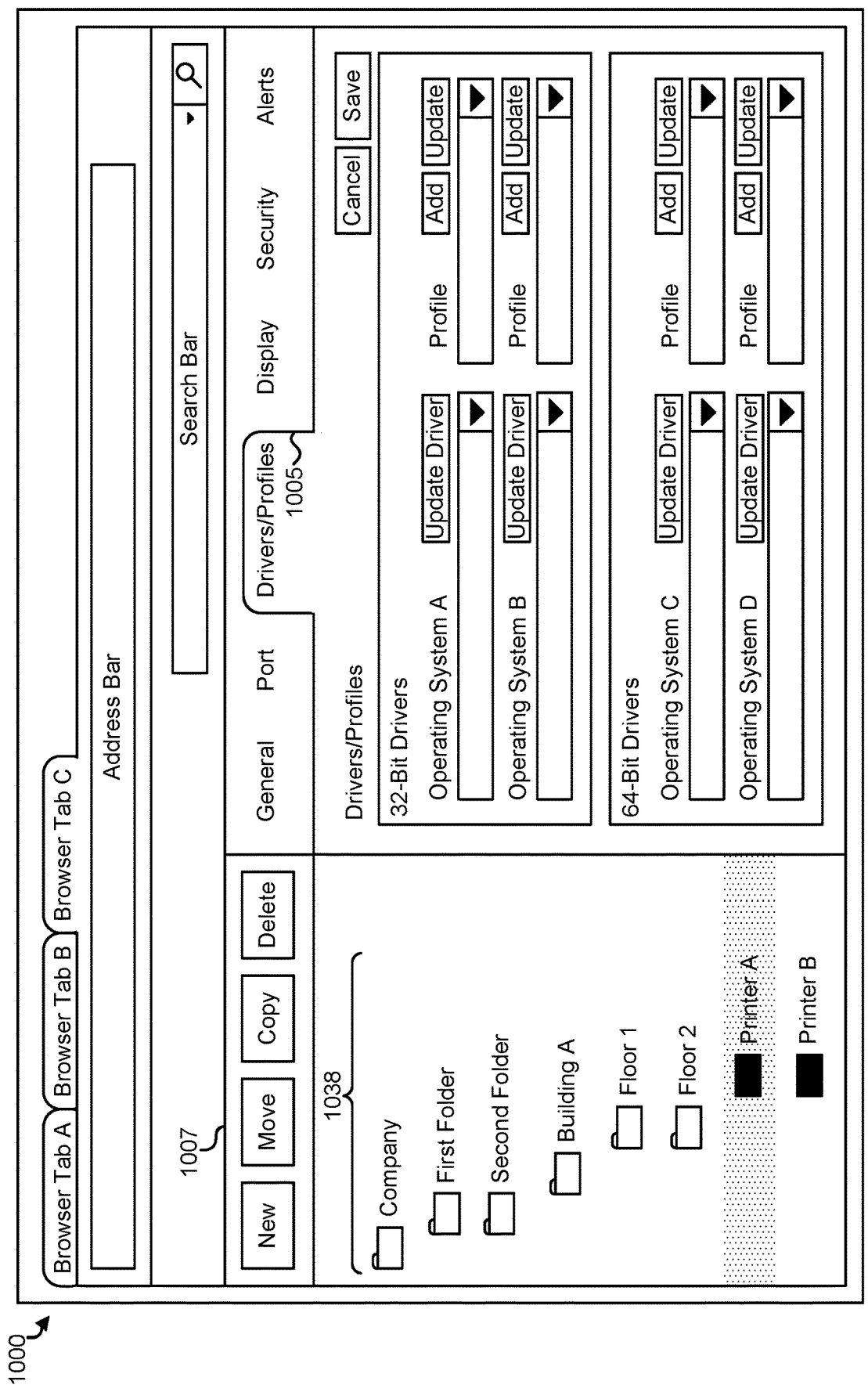
FIG. 10 is a diagram illustrating an example of a UI of a printing manager instance.

FIG. 10 is a diagram illustrating an example of a UI 1000 of a printing manager instance. The UI 1000 may be presented by a computing device (e.g., computing device 102, remote computing device 104). For example, the UI 1000 may be presented and/or accessed via a website and/or an API. For instance, the UI 1000 is depicted as being accessed within a web browser in FIG. 10.

In this example, a drivers/profiles tab 1005 is selected, which shows an interface for adding or updating drivers for a particular printer (i.e., selected printer A). As illustrated, the tab 1005 allows specifying printer drivers corresponding to various computing device operating systems (OSes). Profile drop-down lists are also shown. As described above, the client printing system operator 113 may provide integrated access to multiple printing manager instances. For example, the client printing system operator 113 may enable single-click log in and/or automatic log in to multiple printing manager instances. FIG. 10 illustrates some of the functions that may be accessible via a printing manger instance. For example, the UI 1000 may include controls 1007 for creating, moving, copying, and/or deleting nodes in a data structure 1038. In some configurations, the data structure 1038 illustrated in FIG. 10 may be filtered according to user permissions. For example, only nodes may be presented for which a user has permission to access. In some examples, user permission controls may avoid users accessing other forbidden nodes (e.g., nodes corresponding to a separate client printing system). In some examples, user permissions may allow a user (e.g., service provider) to access nodes for multiple client printing systems. Accordingly, the client printing system operator 113 may enable accessing and/or modifying multiple printing manager instances in an integrated manner.

Figure 11:
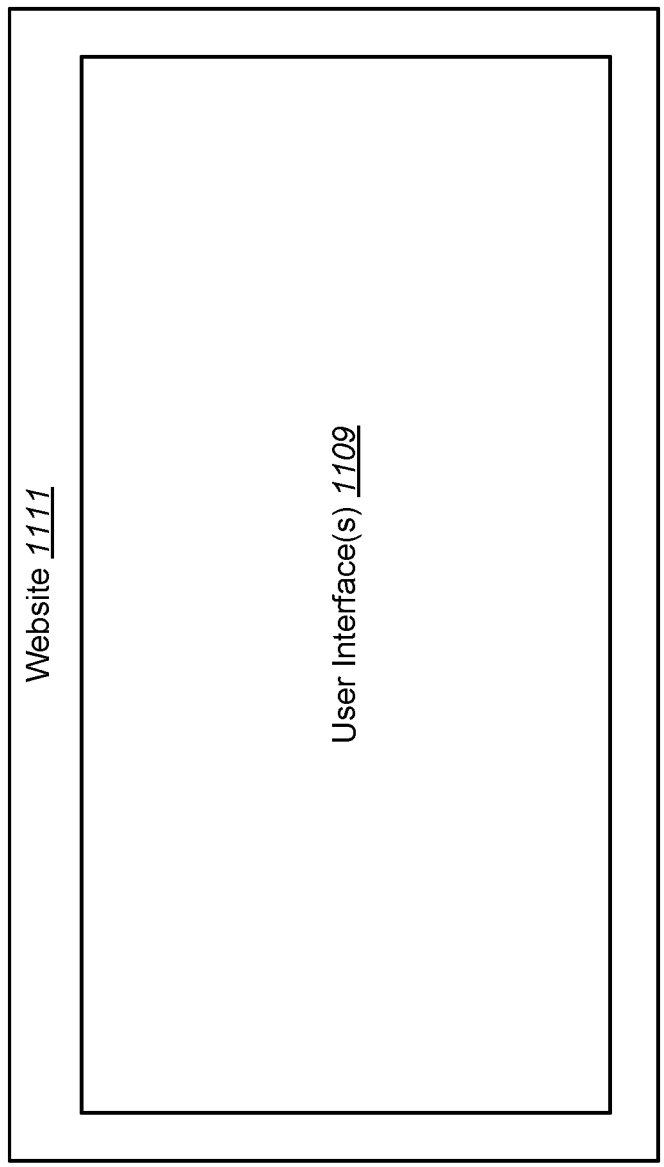
FIG. 11 is a block diagram illustrating a configuration of a website.

FIG. 11 is a block diagram illustrating a configuration of a website 1111. The website 1111 may be an example of the website 111 described in connection with FIG. 1. As illustrated in FIG. 11, the website 1111 may provide one or more user interfaces 1109 for interacting with a computing device configured to operate multiple client printing systems. Examples of the user interface(s) 1109 that may be provided by the website 1111 are given in connection with FIGS. 3-10. In some configurations, the website 1111 may be hosted by a computing device 102. The website 1111 may be accessible via the network(s) 108. The website 1111 may display one or more webpages and/or dialog boxes. A service provider may access the website 1111 to enter information and observe presented information.

Figure 12:
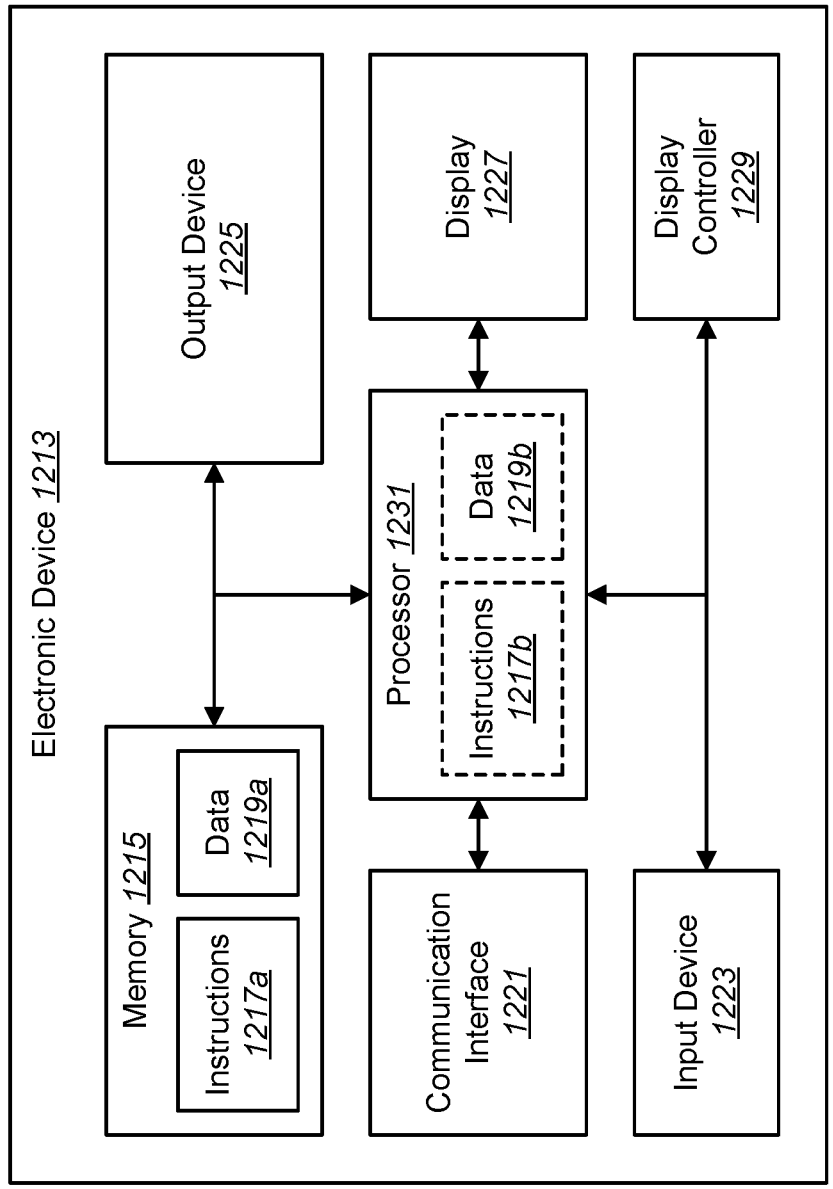
FIG. 12 illustrates various components that may be utilized in an electronic device.

FIG. 12 illustrates various components that may be utilized in an electronic device 1213. The electronic device 1213 may be configured in accordance with one or more of the computing devices 102, 104 described herein.

The electronic device 1213 may include a processor 1231 and memory 1215. The memory 1215 may include instructions 1217a and data 1219a. The processor 1231 controls the operation of the computing device and may be, for example, a microprocessor, a microcontroller, a digital signal processor (DSP) or other device known in the art. The processor 1231 may perform logical and arithmetic operations based on program instructions 1217b and/or data 1219b received from the memory 1215.

The electronic device 1213 may include one or more communication interfaces 1221 for communicating with other electronic devices. The communication interfaces 1221 may be based on wired communication technology, wireless communication technology or both. Examples of different types of communication interfaces 1221 include a serial port, a parallel port, a Universal Serial Bus (USB), an Ethernet adapter, an Institute of Electrical and Electronics Engineers (IEEE) bus interface, a small computer system interface (SCSI) bus interface, an infrared (IR) communication port, a Bluetooth wireless communication adapter and so forth.

The electronic device 1213 may include one or more input devices 1223 and one or more output devices 1225. Examples of different kinds of input devices 1223 include a keyboard, mouse, microphone, remote control device, button, joystick, trackball, touchpad, lightpen, etc. Examples of different kinds of output devices 1225 include a speaker, printer, etc. One specific type of output device 1225 that may be included in a computer system is a display device 1227. Display devices 1227 used with configurations disclosed herein may utilize any suitable image projection technology, such as liquid crystal display (LCD), light-emitting diode (LED), gas plasma, electroluminescence, a cathode ray tube (CRT) or the like.

A display controller 1229 may also be provided, for converting data 1219a stored in the memory 1215 into text, graphics and/or moving images (as appropriate) shown on the display device 1227. Of course, FIG. 12 illustrates only one possible configuration of an electronic device 1213. Various other architectures and components may be utilized.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements. "Instructions" and/or "code" may be executable by a computer or processor to perform one or more functions.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices, removable flash drives or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified and/or omitted without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method for operating multiple client printing systems, comprising:
    creating an administration account for operating the multiple client printing systems;
    instantiating a printing manager instance for each of the multiple client printing systems, wherein the multiple client printing systems are associated with the administration account, and wherein each printing manager instance manages configuration of printer definitions, printer drivers, and licenses to utilize printing cloud software for a single client printing system;
    presenting a data structure comprising an object associated with each of the multiple client printing systems;
    determining license usage data for the licenses to utilize printing cloud software by the multiple client printing systems, wherein determining the license usage data comprises determining a client average license usage for each of the multiple client printing systems for a billing cycle and determining a summary average license usage over all of the multiple client printing systems for the billing cycle; and
    presenting the license usage data.

2. The method of claim 1, wherein determining the license usage data comprises determining a number of installed printers for each of the multiple client printing systems.

3. The method of claim 1, further comprising generating a bill for the billing cycle for the administration account based on the summary average license usage over all of the multiple client printing systems for the billing cycle.

4. The method of claim 1, further comprising determining one or more folders for the data structure, wherein each of the one or more folders includes one or more of the objects associated with one or more of the multiple client printing systems.

5. The method of claim 4, further comprising determining user permissions, comprising granting or restricting access to at least one of the objects or one or more folders for a user account.

6. The method of claim 1, further comprising presenting billing information based on user permissions.

7. The method of claim 1, further comprising sharing settings or resources across multiple printing manager instances.

8. The method of claim 1, further comprising sharing printer drivers and printer profiles across a plurality of the multiple client printing systems.

9. The method of claim 1, further comprising setting a global printing manager instance configuration and applying the global printing manager instance configuration to a plurality of the printing manager instances.

10. A computing device, comprising:
    a processor;
    memory in electronic communication with the processor; and
    instructions stored in the memory, wherein the instructions are executable to:
        create an administration account for operating multiple client printing systems;
        instantiate a printing manager instance for each of the multiple client printing systems, wherein the multiple client printing systems are associated with the administration account, and wherein each printing manager instance manages configuration of printer definitions, printer drivers, and licenses to utilize printing cloud software for a single client printing system;

present a data structure comprising an object associated with each of the multiple client printing systems;

determine license usage data for the licenses to utilize printing cloud software by the multiple client printing systems, wherein determining the license usage data comprises determining a client average license usage for each of the multiple client printing systems for a billing cycle and determining a summary average license usage over all of the multiple client printing systems for the billing cycle; and present the license usage data.

11. The computing device of claim 10, wherein the instructions are executable to determine a number of installed printers for each of the multiple client printing systems.

12. The computing device of claim 10, wherein the instructions are executable to generate a bill for the billing cycle for the administration account based on the summary average license usage over all of the multiple client printing systems for the billing cycle.

13. The computing device of claim 10, wherein the instructions are executable to determine one or more folders for the data structure, wherein each of the one or more folders includes one or more of the objects associated with one or more of the multiple client printing systems.

14. The computing device of claim 13, wherein the instructions are executable to determine user permissions and to grant or restrict access to at least one of the objects or one or more folders for a user account.

15. The computing device of claim 10, wherein the instructions are executable to share settings or resources across multiple printing manager instances.

16. The computing device of claim 10, wherein the instructions are executable to share printer drivers and printer profiles across a plurality of the multiple client printing systems.

17. The computing device of claim 10, wherein the instructions are executable to set a global printing manager instance configuration and to apply the global printing manager instance configuration to a plurality of the printing manager instances.

18. A non-transitory tangible computer-readable medium storing computer executable code, comprising:

code for causing a computing device to create an administration account for operating multiple client printing systems;

code for causing the computing device to instantiate a printing manager instance for each of the multiple client printing systems, wherein the multiple client printing systems are associated with the administration account, and wherein each printing manager instance manages configuration of printer definitions, printer drivers, and licenses to utilize printing cloud software for a single client printing system;

code for causing the computing device to present a data structure comprising an object associated with each of the multiple client printing systems;

code for causing the computing device to determine license usage data for the licenses to utilize printing cloud software by the multiple client printing systems, wherein determining the license usage data comprises determining a client average license usage for each of the multiple client printing systems for a billing cycle and determining a summary average license usage over all of the multiple client printing systems for the billing cycle; and code for causing the computing device to present the license usage data.

* * * * *